United States Patent Office 3,790,530
Patented Feb. 5, 1974

---

3,790,530
METHOD OF MAKING AMIDE-IMIDE RESINS, AROMATIC AMIDES AND AROMATIC POLYAMIDE RESINS
Ernest C. Koerner, William W. Wareham, and Donny R. Disque, Fort Wayne, Ind., assignors to Phelps Dodge Magnet Wire Corporation, Fort Wayne, Ind.
No Drawing. Continuation-in-part of abandoned application Ser. No. 819,954, Apr. 28, 1969. This application Nov. 3, 1971, Ser. No. 195,502
Int. Cl. C08g 22/00
US. Cl. 260—77.5 R
10 Claims

ABSTRACT OF THE DISCLOSURE

A method of making essentially totally imidized polyamide-imide resins, aromatic amides, and other aromatic polyamide resins which can be applied to articles without the resins undergoing substantial chemical change as the resins are being applied, and intermediates formed during the performance of the method. Specific polyamide-imide resins which can be made in accordance with the method of the invention are those derived from tricarboxylic acids or anhydrides thereof, such as trimellitic acid or trimellitic acid anhydride, and a diisocyanate, such as p,p'-diphenyl methane diisocyanate. The method comprises an initial reaction under mild conditions and a subsequent reaction under more severe conditions.

CROSS-REFERENCE TO RELATED APPLICATION

This is a continuation-in-part of application Ser. No. 819,954, filed Apr. 28, 1969, now abandoned.

BACKGROUND OF THE INVENTION

Field of the invention

This invention relates to polyamide-imide resins, aromatic amides, and other aromatic polyamide resins and modifications thereof. More particularly, this invention relates to a method of making polyamide-imide resins, aromatic amides, and other aromatic polyamide resins and modifications thereof, and intermediates formed during the performance thereof, and the application of such materials to articles, for example, to electrical conductors as a coating thereon and to insulated electrical conductors as an overcoat superposed over a coat of base insulation.

DESCRIPTION OF THE PRIOR ART

Polyamide-imide resins have heretofore been formed by converting the carboxyl group of a tricarboxylic acid anhydride, for example, trimellitic anhydride, into an acid halide, freeing the acid halide from excess halide-containing reagent, and reacting the same with a diamine, for example, methylene dianiline, as follows:

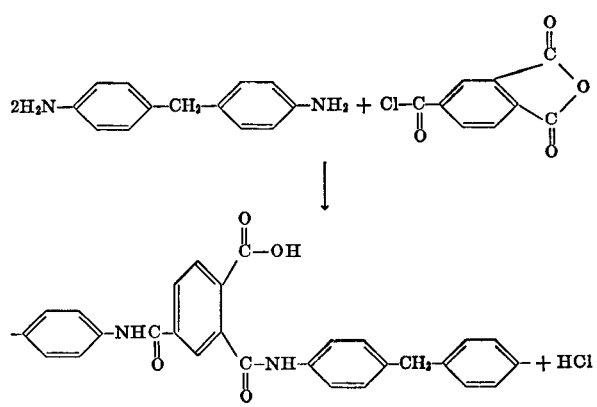

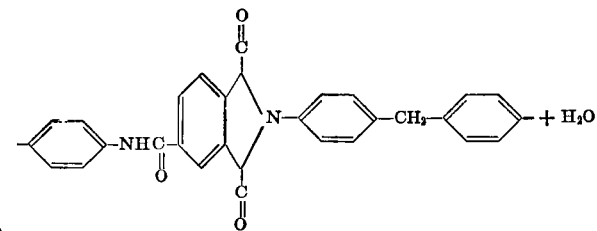

The reaction between the acid chloride group and an amine group produces an amide with a hydrogen halide reaction by-product and the reaction between an amine group and the anhydride group produces an amide-acid group. The amide-acid group, then is converted or cured into an imide in accordance with the above reaction which produces water. Both of the reaction by-products, hydrogen halide and water, must be eliminated from the resin prior to or during curing of the resin.

Thus, the conventional methods of making polyamide-imide resins, aromatic amides, and other aromatic polyamide resins each comprise several reaction steps and the separation of reaction products from the resulting resin. For these reasons, it is highly desirable to provide an improved method for making polyamide-imide resins, aromatic amides, and other aromatic polyamide resins.

With particular reference to the polyamide-imide resins several difficulties have been experienced when these resins are used as coatings on articles such as magnet wire. First, since these resins in an uncured state include an amide-acid group and may include hydrochloric acid or organic chloride which has not been completely eliminated from the resin solution, these resins conventionally require stainless steel equipment, rather than less expensive non-stainless equipment. Also, conventionally, it has often not been possible to apply a uniform, smooth coat of cured resin on such articles. For example, a commercial polyamide-imide resin (AI type 10 resin, or AI537 enamel, as sold by Amoco Chemicals Company) when applied to a magnet wire and cured, yields a wire enamel which has several deficiencies, often starting with poor runability, slow curing, requiring high temperatures, and often adhering poorly to a copper substrate. Many of the objectionable properties associated with coatings of these resins can be attributed to the tendency of such resins to blister. The blistering of the resin occurs during the "curing" of the resin and is due to the expulsion of the reaction products aforementioned, water and any halide reaction product remaining, from the resin. While the hydrochloric acid or other halide-containing reaction products can be eliminated from the resin prior to or during application, it has generally been known that such resins must be applied from solution partly or wholly in an amide-acid form in order to render the resins soluble. For these reasons, it is highly desirable to provide an improved method for making essentially completely imidized polyamide-imide resins, aromatic amides, and other aromatic polyamide resins which can be applied to articles, for example, magnet wire, without the resins undergoing substantial chemical change or requiring the expulsion of unwanted reaction by-products, during application.

Others have reacted carboxylic acids and acid anhydrides with isocyanates for a variety of purposes. Soluble aromatic amide anhydrides for use as curing agents for epoxy resins have been made by reacting aromatic acid anhydrides with isocyanates. Fusible aliphatic polyamides have been prepared by reacting totally aliphatic carboxylic acids and isocyanates. Aromatic carboxylic acid anhydrides have also been reacted with an excess of aromatic isocyanates to form imide containing polyisocyanates, triisocyanates to form cross-linked low molecular weight materials, and aromatic isocyanates and diamines to form urea containing materials. Also, mixtures of aliphatic and aromatic carboxylic acid and anhydrides and isocyanates have been reacted to form copolymers, and aromatic carboxylic acid anhydrides have been dissolved in aromatic diisocyanates and reacted to form foamed reaction products. Further, reactions between isocyanates and vicinal carboxylic acid groups are known. See the following U.S. patents:

| | |
|---|---|
| 3,489,696 | 3,300,420 |
| 3,578,639 | 2,268,586 |
| 3,562,217 | 3,317,480 |
| 3,314,923 | | and British Pat. No. 1,009,956 and French Pat. No. 1,498,015.

Further, polyamide-imide resins have been made from aromatic diisocyanates and aromatic carboxylic acid anhydrides. However, such processes tend to produce vigorous, violent or explosive reactions which cannot be easily controlled and may be uncontrollable in large scale commercial equipment. Such reactions also tend to form nonlinear or low molecular weight products having relatively broad molecular weight distributions. Such materials are not preferred as coatings such as wire enamels. In contrast, high molecular weight, essentially linear materials having a relatively narow molecular weight distribution, such as the resin materials herein disclosed and claimed, are preferred. Others have recognized this deficiency in existing processes and have proposed reactions between aromatic isocyanates and aromatic carboxylic acid anhydrides in small amounts of solvent followed by a solid state reaction and under conditions which do not allow the reaction to go to completion thereby forming a partially polymerized reaction product. See British Pat. No. 1,220,590 and U.S. Pat. No. 3,592,789. The latter partially polymerized reaction product has disadvantages upon applying the same as a coating similar to those discussed hereinabove with regard to the resins including an amide-acid group inasmuch as further polymerization and the expulsion of carbon dioxide etc. will occur during curing thus rendering it difficult to apply uniform smooth coats of resin without blistering, and the like. Further, solid state reactions necessarily involves different control problems and equipment more expensive than the non-stainless conventional equipment aforementioned.

Further, it is well known that an insulated conductor may be upgraded by superposing an overcoat of a high molecular weight, linear, strong and thermally stable resin thereon. Such an overcoated, insulated magnet wire is disclosed in U.S. Pat. No. 3,022,200. This patent discloses and claims a magnet wire having a base coat of nonlinear, cross-linked and thermoset polyester insulation and an overcoat of a high molecular weight, linear, strong and thermally stable different resin. The term "polyester resin" as used herein refers to any resin having a plurality of ester groups therein, and includes polyester imide, polyamide ester and polyester-amide-imide resins. Such an overcoated magnet wire has better heat shock, solvent shock and winding properties than the insulated magnet wire without the overcoat. The same insulated magnet wire having an overcoat of polyamide-imide resin also has better properties than a magnet wire consisting of only a base insulation of a thermally stable crosslinked polyester or polyester imide or polyester amide-imide.

For these reasons, it is highly desirable to provide an improved method of making polyamide-imide resins and an improved method of applying the same to articles such as conductors or insulated conductors.

The term "aromatic polyamide resins" as used herein refers to that group of resins which contain a plurality of amide groups therein. This group includes polyamine-imide resins, polyamide-ester resins, and polyester-amide-imide resins.

SUMMARY OF THE INVENTION

It is therefore the primary object of this invention to provide an improved method of making aromatic amides.

Another object of this invention is to provide an improved magnet wire enamel and impregnating varnish.

Another object of this invention is to provide an improved impregnating varnish for electrical apparatus.

Another object of this invention is to provide an improved method of making polyamide resins, including soluble essentially totally imidized polyamide-imide resins.

Another object of this invention is to provide new compositions of matter which can be converted into aromatic amides.

Another object of this invention is to provide new compositions of matter which can be converted into aromatic amides and polyamide resins, including an essentially totally imidized polyamide-imide resin solution.

Yet another object of this invention is to provide an improved method of applying a coat of polyamide-imide resin to articles, including conductors with and without a base coat of insulation thereon.

A further object of the invention is to provide an improved method of applying to articles such as conductors with and without a base coat of insulation thereon a coat of polyamide-imide resin without undergoing substantial chemical change or requiring the expulsion of unwanted reaction products.

Still further an object of this invention is to provide an improved method of superposing an overcoat of polyamide-imide resin on an insulated magnet wire having a base coat of a polyester-resin or polyester-imide resin or polyester-amide-imide resin, without the polyamide-imide resin downgrading or attacking the resin of the base coat or blistering.

Still further another object of this invention is to provide an improved polyamide-imide resin solution in which the resin is essentially completely imidized, in contrast to being in an amide-acid form.

In the broader aspects of this invention there is provided a method comprising the step of reacting substantially equal molar amounts of aromatic isocyanate and aromatic carboxylic acid and/or acid anhydride, a composition of matter comprising the reaction product of aromatic isocyanate and carboxylic acid and/or acid anhydride which includes an intermediate group having the formula:

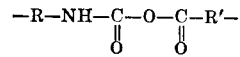

where R and R' are multivalent hydrocarbon radicals, and a method comprising the step of dissolving a tricarboxylic acid and/or acid anhydride in an inert solvent or an inert solvent and a minor amount of diluent, adding aromatic diisocyanate to the resultant solution, the solution containing less than about 50% weight diisocyanate, acid and/or acid anhydride, allowing the same to react at temperatures ranging from about 10° C. to about 80° C. at atmospheric pressure, forming a polyamide resin from the reaction product, applying a coat of said solution to an article, and eliminating the solvent and diluent if any therefrom.

DESCRIPTION OF THE PREFERRED EMBODIMENT

In accordance with the present invention, amides are formed by reacting essentially stoichiometric amounts of a carboxylic acid and an isocyanate. The method of the present invention provides a process for manufacturing aromatic amides and aromatic polyamide resins including essentially imidized, polyamide-imide resins in conventional commercial size equipment from essentially stoichiometric amounts of carboxylic acids and/or acid anhydrides and isocyanates. The process is especially useful in producing soluble, essentially linear, high molecular weight materials which can be applied to articles as a coating from solution, for example, magnet wire enamels.

It is well known that the reaction between an acid or an acid anhydride and an isocyanate is a vigorous reaction which is difficult to control. Processes that have been developed heretofore in laboratory glass-ware apparatus have been difficult to control in commercial size equipment where the agitation, temperature and viscosity control and other control techniques, possible in glass-ware equipment, are not readily applicable. The invention disclosed herein is a method of making polyamide-imide resins, aromatic amides, and other aromatic polyamide resins in conventional commercial equipment without the control problems experienced with prior art processes. By the method of the invention, the reactions involved can be carried to completion to form soluble, essentially linear, high molecular weight reaction products which have relatively narrow molecular weight distributions. These products are stable in solution and can be stored for many months prior to use. Such materials being essentially linear and of high molecular weight tend to be very flexible coatings with the best possible physical properties and can be applied to articles as a coating without undergoing substantial chemical change.

The reactions herein disclosed between carboxylic acids and acid anhydrides and isocyanates are carried out in accordance with the method of the invention in two distinct reaction steps. First, the acid or acid anhydride and the isocyanate are reacted at a temperature ranging from room temperature to about 80° C. at atmospheric pressure, the reactants both being previously dissolved in an inert polar solvent, for example, N-methyl pyrrolidone, N,N-dimethyl formamide, N,N-diethyl formamide, or N,N-diethyl acetamide. The term "room temperature" as used herein is about 20° C. plus or minus 10° C. Minor amounts of diluent can be used with an inert polar solvent if desired. See Examples I through V, VII, IX, X and XII for example. The term "inert solvent" is used herein to connote inert polar solvents, and mixtures of inert polar solvents and diluents which are useful in the practice of the invention. Such solvents, i.e., polar solvents and combinations of polar solvents and diluents which are useful in the practice of the invention must dissolve both the reactants and the reaction product and not react with either the reactants or the reaction product at reaction conditions. The reaction solution comprising the reactants and inert solvents always is less than 50% weight reactants, the remainder being solvent or solvent and diluent. Thus, reaction solution is always more than 50% weight solvent or solvent and diluent. The initial reaction using, for example, trimellitic anhydride, p,p'-diphenyl methane diisocyanate and N-methyl pyrrolidone, is believed to occur as follows:

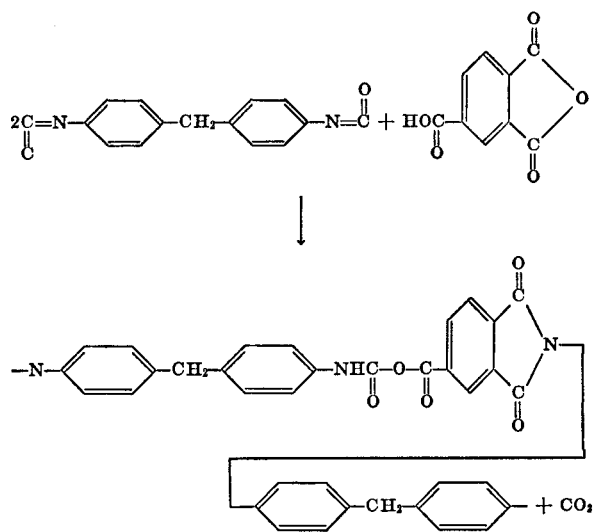

This initial reaction at the reaction conditions herein disclosed is essential to the invention. By the inclusion of this reaction between isocyanate and carboxylic acid and/or acid anhydride in solution wherein the solvent thereof is always more than 50% weight of the solution at temperatures ranging from room temperatures to about 80° C. at atmospheric pressure, polyamide-imide resins, aromatic amides and other aromatic polyamide resins can be made in conventional commercial equipment without the control problems experienced with prior art processes. Further, as a result of the control possible, the reactions can be carried to completion to form soluble, essentially linear, high molecular weight reaction products which have relatively narrow molecular weight distributions.

The amide-intermediate can then be transformed into an amide accompanied by the expulsion of additional carbon dioxide by heating the reaction product to temperatures of about 150° C. to about 200° C. at atmospheric pressure as follows:

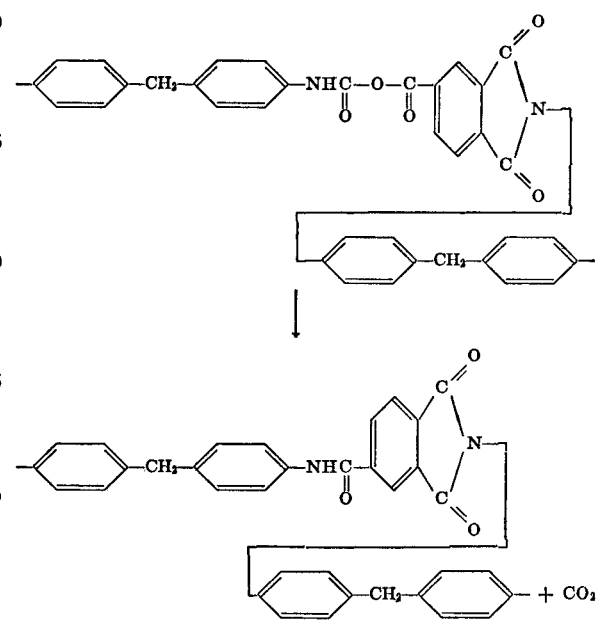

The two distinct reaction steps transform the reactants, trimellitic acid anhydride and p,p'-diphenyl methane diisocyanate into a polyamide imide resin product. The reaction between an isocyanate group and the anhydride group of the trimellitic acid anhydride forms an imide by a known mechanism. The amide-acid and incompletely imidized reaction products formed in prior art processes are not formed in the performance of the method of the invention.

In accordance with the method of the invention, essentially stoichiometric amounts of carboxylic acid and/or acid anhydride and isocyanate are reacted. Excess isocyanate is not desired. However, isocyanates are well known to react with water; and thus, lose reactivity upon absorbing moisture or reacting the isocyanate with wet reactants or dissolving the same in wet solvents. It has been discovered that reproduceable results occur when from about 1.0 to about 1.05 moles of isocyanate are reacted with about 1.0 mole of acid and/or acid anhydride or about 1.0 to about 1.05 moles of acid and/or acid anhydride are reacted with about 1.0 mole of isocyanate provided that the inert solvent contains no more than 0.15% weight water. While excess isocyanate cannot be tolerated as it leads to unstable isocyanate terminated reaction products, small amounts of excess acid or acid anhydride can be tolerated. The above limits are what are deemed herein to be "essentially equal molar" or "essentially stoichiometric amounts of" reactants. From about 0.95 to 1.0 mole of diisocyanate to about 1.0 mole of acid or acid anhydride is the most preferred ratio of reactants.

As herein disclosed, carboxylic acids, carboxylic acid anhydrides, and combinations of carboxylic acid anhydrides can be reacted with isocyanates in accordance with the invention. While carboxylic acids can be reacted with isocyanates in accordance with the invention, such a reaction produces water which is not desired in the reaction solution or the reaction product. Thus, the reactions between carboxylic acids and combinations of carboxylic acids and carboxylic acid anhydrides comprising a major amount of carboxylic acid and isocyanates are not preferred. Examples 1011 through 2020 illustrate the combinations of carboxylic acids and carboxylic acid anhydrides containing not more than 5% weight acid result in the preferred reaction products of the invention. Examples 1011 through 2020 illustrate that combinations of carboxylic acids and carboxylic acid anhydrides containing not more than 5% weight acid (which is substantially the same as 5% acid on a molar basis) result in the preferred reaction products of the invention. In fact, commercial grade carboxylic acid anhydride usually contains some acid inasmuch as acid is formed as the result of the anhydride hydrolyzing.

The reactions described hereinabove can be carried out in accordance with the invention with any aromatic carboxylic acid and isocyanate to form aromatic amides. To form aromatic polyamide resins, the reactions of the method of the invention are performed with difunctional reactants, for example, aromatic diisocyanates, and difunctional aromatic carboxylic acids and/or carboxylic acid anhydrides.

The following examples will illustrate the present invention as it relates to the production of essentially linear aromatic polyamide-imide resins.

Example I

A solution is formed by dissolving 60 grams (0.31 mole) of trimellitic acid anhydride in 496.8 grams of N-methyl pyrrolidone and 55.2 grams of an aromatic solvent (NJ–100 solvent, as sold by Hoosier Solvents and Chemicals Corporation) by stirring the same at room temperature and atmospheric pressure. Both the aromatic solvent and the N-methyl pyrrolidone contain less than 0.12% weight water. After a clear solution is obtained, 78 grams (0.31 mole) of p,p'-diphenyl methane diisocyanate (Multrathane M, as sold by Mobay Chemical Company) is added to the solution and the solution is mixed very slowly for about 30 minutes. The solution is then allowed to stand, without stirring, at room temperature and atmospheric pressure for about 24 hours. The solution is then once again agitated and the solution temperature is raised to about 190° C. The solution is maintained at this temperature and atmospheric pressure and agitated for about 2 hours. A condenser is used to prevent solvent loss. The resultant solution is cooled to room temperature and filtered, if necessary. The viscosity of the product at 30° C. was measured at about 880 cps., utilizing a Brookfield viscometer and a resin solution of approximately 20% weight resin and 80% weight solvent.

The resultant solution was then applied to a bare copper conductor having no insulation thereon employing dies and a conventional wire coating tower at 33 feet per minute, having bank temperatures of 850° F., 800° F. and 600° F. Six coats were applied in this manner. The properties of the resultant magnet wire and the properties of a similar bare conductor coated with a commercially available polyamide-imide resin (AI–537 polyamide-imide enamel, as sold by Amoco Chemical Company) are compared in Table I.

Example II

A solution is formed by dissolving 60 grams (0.31 mole) of trimellitic acid anhydride in 372.6 grams of N-methyl pyrrolidone and 41.4 grams of an aromatic solvent (NJ–100 solvent, as sold by Hoosier Solvents and Chemicals Corporation) by stirring the same at room temperature and atmospheric pressure. Both the aromatic solvent and the N-methyl pyrrolidone contain less than 0.12% weight water. After a clear solution is obtained, 78 grams (0.31 mole) of p,p'-diphenyl methane diisocyanate (Multrathane M, as sold by Mobay Chemical Company) is added to the solution and the solution is mixed very slowly for about 30 minutes. The solution is then allowed to stand, without stirring, at room temperature and atmospheric pressure for about 24 hours. The solution is then once again agitated and the solution temperature is raised to about 190° C. The solution is maintained at this temperature and atmospheric pressure and agitated for about 2 hours. A condenser is used to prevent solvent loss. The resultant solution is cooled to room temperatures and filtered, if necessary. This viscosity of the product at 30° C. was measured at about 1800 cps. utilizing a Brookfield viscometer and a resin solution of approximately 25% weight resin and 75% weight solvent.

The resultant solution was then applied in six consecutive coats to a bare copper conductor having no insulation thereon and in two consecutive coats to an insulated conductor having a base coat consisting of four consecutive coats of a thermosetting polyester (Isonel 200E polyester enamel, as sold by Schenectady Chemicals Corporation) employing dies and a conventional wire coating tower at 33 feet per minute having bank temperatures of 850° F., 800° F. and 600° F. The properties of the resultant magnet wire and the properties of a similar bare conductor and an insulated conductor having a coating of a commercially available polyamide-imide resin (AI–537 polyamide-imide enamel, as sold by Amoco Chemicals Company) are shown in Table I.

Example III

A solution is formed by dissolving 60 grams (0.31 mole) of trimellitic acid anhydride in 372.6 grams of N-methyl pyrrolidone and 41.4 grams of an aromatic solvent (NJ–100 solvent, as sold by Hoosier Solvents and Chemicals Corporation) by stirring the same at room temperature and at atmospheric pressure. Both the aromatic solvent and the N-methyl pyrrolidone contain less than 0.12% weight water. After a clear solution is obtained, 78 grams (0.31 mole) of p,p'-diphenyl methane diisocyanate (Multrathane M as sold by Mobay Chemical Company) is added to the solution and the solution is mixed very slowly for about 30 minutes. The solution is then allowed to stand, without stirring, at room temperature and atmospheric pressure for about 16 hours. The solution is then once again agitated and the solution temperature is raised to about 190° C. The solution is maintained at this temperature and atmospheric pressure and agitated for about two hours. A condenser is used to prevent solvent loss. The resultant solution is cooled to room temperature and filtered, if necessary. The viscosity of the product at 30° C. was measured at about 1000 cps., utilizing a Brookfield viscometer and a resin solution of approximately 25% weight resin and 75% weight solvent.

The resultant solution was then applied to an insulated conductor, having a base coat consisting of four consecutive coats of a thermosetting polyester (Isonel 200E polyester enamel, as sold by Schenectady Chemicals Corporation) employing dies and a conventional wire coating tower at 33 feet per minute, having bank temperatures of 850° F., 800° F. and 600° F. Two coats were applied in this manner. The properties of the resultant insulated conductor and a similar insulated conductor having a coating of a commercially available polyamide-imide resin (AI–537 polyamide-imide enamel, as sold by Amoco Chemicals Company) are shown in Table I.

Example IV

A solution is formed by dissolving 60 grams (0.31 mole) of trimellitic acid anhydride in 504.0 grams of N-methyl pyrrolidone and 80 grams of an aromatic solvent (NJ–100 solvent, as sold by Hoosier Solvents and Chemicals Corporation) by stirring the same at room temperature and atmospheric pressure. Both the aromatic solvent and the N-methyl pyrrolidone contain less than 0.15% weight water. After a clear solution is obtained, 80 grams (0.318 mole) of p,p'-diphenyl methane diisocyanate (Multrathane M, as sold by Mobay Chemical Company) is added to the solution, and the solution is mixed very slowly for about 30 minutes. The solution is then allowed to stand, without stirring, at room temperature and atmospheric pressure for about 20 hours. The solution is then once again agitated and the solution temperature is raised to about 190° C. The solution is maintained at this temperature and atmospheric pressure and agitated for about 2 hours. A condenser is used to prevent solvent loss. The resultant solution is cooled to room temperature and filtered, if necessary. The viscosity of the product at 30° C. was measured at about 1300 cps., utilizing a Brookfield viscometer and a resin solution of approximately 25% weight resin and 75% weight solvent.

The resultant solution was then applied to an insulated conductor, having a base coat consisting of four consecutive coats of a thermosetting polyester (Isonel 200E polyester enamel, as sold by Schenectady Chemicals Corporation) employing dies and a conventional wire coating tower at 33 feet per minute, having bank temperatures of 850° F., 800° F. and 600° F. Two coats were applied in this manner. The properties of the resultant conductor and an insulated conductor having two coats of a commercially available polyamide-imide resin (AI–537 polyamide-imide enamel, as sold by Amoco Chemicals Company) are shown in Table I.

Example V

A solution is formed by dissolving 60 grams (0.31 mole) of trimellitic acid anhydride in 372.6 grams of N-methyl pyrrolidone and 41.4 grams of an aromatic solvent (NJ–100 solvent, as sold by Hoosier Solvents and Chemicals Corporation) by stirring the same at room temperature and atmospheric pressure. Both the aromatic solvent and the N-methyl pyrrolidone contain less than 0.12% weight water. After a clear solution is obtained, 78 grams of p,p'-diphenyl methane diisocyanate (Multrathane M, as sold by Mobay Chemical Company) is added to the solution and the solution is mixed very slowly for about 30 minutes. The solution is then allowed to stand, without stirring, at room temperature and atmospheric pressure for about 72 hours. The solution is then once again agitated and the solution temperature is raised to about 190° C. The solution is maintained at this temperature and atmospheric pressure and agitated for about 2 hours.

A condenser is used to prevent solvent loss. The resultant solution is cooled to room temperature and filtered, if necessary. The viscosity of the product at 30° C. was measured at about 4000 cps., utilizing a Brookfield viscometer and a resin solution of approximately 25% weight resin and 75% weight solvent.

The resultant solution was then applied in six consecutive coats to a bare copper conductor having no insulation thereon and in two consecutive coats to an insulated conductor having a base coat consisting of four coats of an imidized modification of a polyester resin (Isomid enamel, as sold by Schenectady Chemicals Corporation) employing dies and a conventional wire coating tower at 33 feet per minute having bank temperatures of 850° F., 800° F. and 600° F. Two coats were applied in this manner. The properties of the resultant magnet wire and the properties of a similar bare conductor and an insulated conductor having two coats of a commercially available polyamide-imide resin (AI–537 polyamide-imide enamel, as sold by Amoco Chemicals Company) are shown in Table I.

Example VI

A solution is formed by dissolving 63 grams (0.325 mole) of trimellitic acid anhydride in 314 grams of N-methyl pyrrolidone by stirring the same at room temperature and atmospheric pressure. The N-methyl pyrrolidone contains less than 0.12% weight water. After clear solution is obtained, 78 grams (0.31 mole) of p,p'-diphenyl methane diisocyanate (Multrathane M as sold by Mobay Chemical Company) is added to the solution and the solution is mixed very slowly for about 30 minutes. The solution is then allowed to stand, without stirring, at a temperature of about 65° C. and atmospheric pressure for about 12 hours. The solution is then once again agitated and the solution temperature is raised to about 200° C. The solution is maintained at this temperature and atmospheric pressure and agitated for about two hours. A condenser is used to prevent loss. The resultant solution is cooled to room temperature and filtered if necessary. The resultant solution is cooled to room temperature and filtered if necessary. The resultant solution is adjusted by dilution to a resin solution of approximately 25% weight resin and 75% solvent.

The resultant solution was then applied in six consecutive coats to a bare copper conductor having no insulation thereon and in two consecutive coats to an insulated conductor having a base coat consisting of four coats of the imidized modification of a polyester resin employing dies in a conventional wire coating tower at 33 feet per minute, having bank temperatures of 850° F., 800° F., and 600° F. The properties of the resultant magnet wire and the properties of a similar bare conductor and an insulated conductor having two coats of a commercially available polyamide-imide resin (AI–537 polyamide-imide enamel, as sold by Amoco Chemicals Company) are comparable.

Example VII

A solution is formed by dissolving 60 grams (0.31 mole) trimellitic acid anhydride in 600 grams of N-methyl pyrrolidone and 110 grams of an aromatic solvent (NJ–100 solvent, as sold by Hoosier Solvents and Chemicals Corporation) by stirring the same at room temperature and atmospheric pressure. Both the aromatic solvent and the N-methyl pyrrolidone contain less than 0.15% weight water. After a clear solution is obtained, 82 grams (0.326 mole) of p,p'-diphenyl methane diisocyanate (Multrathane M, as sold by Mobay Chemical Company) is added to the solution and the solution is mixed very slowly for about 30 minutes. The solution is then allowed to stand, without stirring, at about 80° C. and atmospheric pressure for about five hours. The solution is then once again agitated and the solution temperature is raised to about 200° C. The solution is maintained at this temperature and atmospheric pressure and agitated for about two hours. A condenser is used to prevent solvent loss. The resultant solution is cooled to room temperature and filtered, if necessary. The resultant solution is adjusted by dilution to a resin solution of approximately 25% weight resin and 75% solvent.

The resultant solution was then applied in six consecutive coats to a bare copper conductor having no insulation thereon and in two consecutive coats to an insulated conductor having a base coat consisting of four coats of imidized modification of a polyester resin employing dies in a conventional wire coating tower at 33 feet per minute, having bank temperatures of 850° F., 800° F., and 600° F. The properties of the resultant magnet wire and the properties of a similar bare conductor and an insulated conductor having two coats of a commercially available polyamide-imide resin (AI–537 polyamide-imide enamel, as sold by Amoco Chemicals Company) are comparable.

Example VIII

A solution is formed by dissolved 63 grams (0.325 mole) of trimellitic acid anhydride in 154 grams of N-methyl pyrrolidone by stirring the same at room temperature and atmospheric pressure. The N-methyl pyrrolidone used contained less than 0.12% weight water. After a clear solution is obtained, 78 grams (0.31 mole) of p,p'-diphenyl methane diisocyanate (Multrathane M, as sold by Mobay Chemical Company) is added to the solution and the solution is mixed very slowly for about 30 minutes. The solution is then allowed to stand, without stirring, at about 80° C. and atmospheric pressure for about five hours. The solution is then once again agitated and the solution temperature is raised to about 200° C. The solution is maintained at this temperature and atmospheric pressure and agitated for about two hours. A condenser is used to prevent loss. The resultant solution is cooled to room temperature and filtered, if necessary. The resultant solution is adjusted by dilution to a resin solution of approximately 25% weight resin and 75% solvent.

The resultant solution was then applied in six consecutive coats to a bare copper conductor having no insulation thereon and in two consecutive coats to an insulated conductor having a base coat consisting of four coats of imidized modification of a polyester resin employing dies in a conventional wire coating tower at 33 feet per minute, having bank temperatures of 850° F., 800° F., and 600° F. The properties of the resultant magnet wire and the properties of a similar bare conductor and an insulated conductor having two coats of a commercially available polyamide-imide resin (AI-537 polyamide-imide enamel, as sold by Amoco Chemicals Company) are comparable.

Example IX

A solution is formed by dissolving 63 grams (0.325 mole) of trimellitic acid anhydride in 700 grams of N-methyl pyrrolidone and 129 grams of an aromatic solvent (NJ-100 solvent, as sold by Hoosier Solvents and Chemicals Corporation) by stirring the same at room temperature and atmospheric pressure. Both the aromatic solvent and the N-methyl pyrrolidone contain less than 0.12% weight water. After a clear solution is obtained, 78 grams (0.31 mole) of p,p'-disphenyl methane diisocyanate (Multrathane M, as sold by Mobay Chemical Company) is added to the solution and the solution is mixed very slowly for about 30 minutes. The solution is then allowed to stand, without stirring, at about 65° C. and atmosphere pressure for about 12 hours. The solution is then once again agitated and the solution temperature is raised to about 200° C. The solution is maintained at this temperature and atmospheric pressure and agitated for about two hours. A condenser is used to prevent solvent loss. The resultant solution is cooled to room temperature and filtered, if necessary. The resultant solution is adjusted by dilution to a resin solution of approximately 25% weight resin and 75% solvent.

The resultant solution was then applied in six consecutive coats to a bare copper conductor having no insulation thereon and in two consecutive coats to an insulated conductor having a base coat consisting of four coats of imidized modification of a polyester resin employing dies in a conventional wire coating tower at 33 feet per minute, having bank temperatures of 850° F., 800° F., and 600° F. The properties of the resultant magnet wire and the properties of a similar bare conductor and an insulated conductor having two coats of a commercially available polyamide-imide resin (AI-537 polyamide-imide enamel, as sold by Amoco Chemicals Company are comparable.

Example X

A solution is formed by dissolving 60 grams (0.31 mole) of trimellitic acid anhydride in 700 grams of N-methyl pyrrolidone and 129 grams of an aromatic solvent (NJ-100 solvent, as sold by Hoosier Solvents and Chemicals Corporation) by stirring the same at room temperature and atmospheric pressure. Both the aromatic solvent and the N-methyl pyrrolidone contain less than 0.12% weight water. After a clear solution is obtained, 78 grams (0.31 mole) of p,p'-diphenyl methane diisocyanate (Multrathane M, as sold by Mobay Chemical company) is added to the solution and the solution is mixed very slowly for about 30 minutes. The solution is then allowed to stand, without stirring, at about 65° C. and atmospheric pressure for about 12 hours. The solution is then once again agitated and the solution temperature is raised to about 200° C. The solution is maintained at this temperature and atmospheric pressure and agitated for about two hours. A condenser is used to prevent solvent loss. The resultant solution is cooled to room temperature and filtered, if necessary. The resultant solution is adjusted by dilution to a resin solution of approximately 25% weight resin and 75% solvent.

The resultant solution was then applied in six consecutive coats to a bare copper conductor having no insulation thereon and in two consecutive coats to an insulated conductor having a base coat consisting of four coats of imidized modification of a polyester resin employing dies in a conventional wire coating tower at 33 feet per minutes, having bank temperatures of 850° F., 800° F., and 600° F. The properties of the resultant magnet wire and the properties of a similar bare conductor and an insulated conductor having two coats of a commercially available polyamide-imide resin (AI-537 polyamide-imide enamel, as sold by Amoco Chemicals Company) are comparable.

Example XI

A solution is formed by dissolving 60 grams (0.31 mole) of trimellitic acid anhydride in 150 grams of N-methyl pyrrolidone by stirring the same at room temperature and atmospheric pressure. The N-methyl pyrrolidone contains less than 0.12% weight water. After a clear solution is obtained, 78 grams (0.31 mole) of p,p'-diphenyl methane diisocyanate (Multrathane M, as sold by Mobay Chemical Company) is added to the solution and the solution is mixed very slowly for about 30 minutes. The solution is then allowed to stand without stirring at approximately 65° C. and atmospheric pressure for about 12 hours. The solution is then once again agitated and the solution temperature is raised to about 200° C. The solution is maintained at this temperature and atmospheric pressure and agitated for about two hours. A condenser is used to prevent solvent loss. The resultant solution is cooled to room temperature and filtered, if necessary. The resultant solution is adjusted by dilution to a resin solution of approximately 25% weight resin and 75% solvent.

The resultant solution was then applied in six consecutive coats to a bare copper conductor having no insulation thereon and in two consecutive coats to an insulated conductor having a base coat consisting of four coats of imidized modification of a polyester resin employing dies in a conventional wire coating tower at 33 feet per minute, having bank temperatures of 850° F., 800° F., and 600° F. The properties of the resultant magnet wire and the properties of a similar bare conductor and an insulated conductor having two coats of a commercially available polyamide-imide resin (AI-537 polyamide-imide enamel, as sold by Amoco Chemicals Company) are comparable.

Example XII

A solution is formed by dissolving 60 grams (0.31 mole) of trimellitic acid anhydride in 700 grams of N-methyl pyrrolidone and 129 grams of an aromatic solvent (NJ-100 solvent, as sold by Hoosier Solvents and Chemicals Corporation) by stirring the same at room temperature and atmospheric pressure. Both the aromatic solvent and the N-methyl pyrrolidone contain less than 0.12% weight water. After a clear solution is obtained, 78 grams (0.31 mole) of p,p'-diphenyl methane diisocyanate (Multrathane M, as sold by Mobay Chemical Company) is added to the solution and the solution is mixed very slowly for about 30 minutes. The solution is then allowed to stand, without stirring, at about 80° C. and atmospheric pressure for about five hours. The solution is then once again agitated and the solution temperature is raised to about 200° C. The solution is maintained at this temperature and atmospheric pressure and agitated for about two hours. A condenser is used to prevent solvent loss. The resultant solution is cooled to room temperature and filtered, if necessary. The resultant solution is adjusted by dilution to a resin solution of approximately 25% weight resin and 75% solvent.

The resultant solution was then applied in six consecutive coats to a bare copper conductor having no insulation thereon and in two consecutive coats to an insulated conductor having a base coat consisting of four coats of imidized modification of a polyester resin employing dies in a conventional wire coating tower at 33 feet per minute, having bank temperatures of 850° F., 800° F., and 600° F. The properties of the resultant magnet wire and the properties of a similar bare conductor and an insulated conductor having two coats of a commercially available polyamide-imide resin (AI–537 polyamide-imide enamel, as sold by Amoco Chemicals Company) are comparable.

Example XIII

A solution is formed by dissolving 60 grams (0.31 mole) of trimellitic acid anhydride in 150 grams of N-methyl pyrrolidone by stirring the same at room temperature and atmospheric pressure. The N-methyl pyrrolidone used contains less than 0.12% weight water. After a clear solution is obtained, 78 grams (0.31 mole) of p,p'-diphenyl methane diisocyanate (Multrathane M, as sold by Mobay Chemical Company) is added to the solution and the solution is mixed very slowly for about 30 minutes. The solution is then allowed to stand, without stirring, at about 80° C. and atmospheric pressure for five hours. The solution is then once again agitated and the solution temperature is raised to about 200° C. The solution is maintained at this temperature and atmospheric pressure and agitated for about two hours. A condenser is used to prevent solvent loss. The resultant solution is cooled to room temperature and filtered, if necessary. The resultant solution is adjusted by dilution to a resin solution of approximately 25% weight resin and 75% solvent.

The resultant solution was then applied in six consecutive coats to a bare copper conductor having no insulation thereon and in two consecutive coats to an insulated conductor having a base coat consisting of four coats of imidized modification of a polyester resin employing dies in a conventional wire coating tower at 33 feet per minute, having bank temperatures of 850° F., 800° F., and 600° F. The properties of the resultant magnet wire and the properties of a similar bare conductor and an insulated conductor having two coats of a commercially available polyamide-imide resin (AI–537 polyamide-imide enamel, as sold by Amoco Chemicals Company) are comparable.

Examples XIV through XXVI

Examples I through XIII are repeated in the same manner as above described except that the reaction solution subsequent to the completion of the first reaction step at the less severe reaction conditions are once again agitated and heated to a temperature of about 150° C. and maintained at this temperature and atmospheric pressure for about eight hours rather than raising the solutions to a temperature of about 190° C. to about 200° C. and maintaining the solutions at that temperature for about two hours as above described. A condenser was also used in these examples to prevent solvent loss. The resultant solutions are cooled to room temperature and filtered, if necessary. The resultant solutions are adjusted by dilution to a resin solution of approximately 25% weight resin and 75% solvent.

The resultant solutions were then applied in six consecutive coats to a bare copper conductor having no insulation thereon and in two consecutive coats to an insulated conductor having a base coat consisting of four coats of imidized modification of a polyester resin employing dies in a conventional wire coating tower at 33 feet per minute, having bank temperatures of 850° F., 800° F., and 600° F. The properties of the resultant magnet wire and the properties of a similar bare conductor and an insulated conductor having two coats of a commercially available polyamide-imide resin-(Al–537 polyamide-imide enamel, as sold by Amoco Chemicals Company) are comparable.

Examples XXVII through XXXIX

Examples I through XIII were repeated as above described except that N,N-dimethyl formamide was substituted for the N-methyl pyrrolidone used in Examples I through XIII. The resultant resin solutions were cooled to room temperature and filtered, if necessary. The resultant solutions are adjusted by dilution to a resin solution of approximately 25% weight resin and 75% solvent.

The resultant solutions were then applied in six consecutive coats to a bare copper conductor having no insulation thereon and in two consecutive coats to an insulated conductor having a base coat consisting of four coats of imidized modification of a polyester resin employing dies in a conventional wire coating tower at 33 feet per minute, having bank temperatures of 850° F., 800° F., and 600° F. The properties of the resultant magnet wire and the properties of a similar bare conductor and an insulated conductor having two coats of a commercially available polyamide-imide resin (AI–537 polyamide-imide enamel, as sold by Amoco Chemicals Company) are comparable.

Examples XXXX through LII

Examples I through XIII were repeated using N,N-diethyl acetamide in substitution for the N-methyl pyrrolidone used in Examples I through XIII. The resultant resin solutions are cooled to room temperature and filtered, if necessary. The resultant solutions are adjusted by dilution to a resin solution of approximately 25% weight resin and 75% solvent.

The resultant solutions were then applied in six consecutive coats to a bare copper conductor having no insulation thereon and in two consecutive coats to an insulated conductor having a base coat consisting of four coats of imidized modification of a polyester resin employing dies in a conventional wire coating tower at 33 feet per minute, having bank temperatures of 850° F., 800° F., and 600° F. The properties of the resultant magnet wire and the properties of a similar bare conductor and an insulated conductor having two coats of a commercially available polyamide-imide resin (AI–537 polyamide-imide enamel, as sold by Amoco Chemicals Company are comparable.

Examples LIII through LXV

Examples I through XIII were repeated using N,N-diethyl formamide in substitution for the N-methyl pyrrolidone used in Examples I through XIII. The resultant resin solutions were cooled to room temperature and filtered, if necessary. The resultant solutions are adjusted by dilution to a resin solution of approximately 25% weight resin and 75% solvent.

The resultant solutions were then applied in six consecutive coats to a bare copper conductor having no insulation thereon and in two consecutive coats to an insulated conductor having a base coat consisting of four coats of imidized modification of a polyester resin employing dies in a conventional wire coating tower at 33 feet per minute, having bank temperatures of 850° F., 800° F., and 600° F. The properties of the resultant magnet wire and the properties of a similar bare conductor and an insulated conductor having two coats of a commercially available polyamide-imide resin (AI–537 polyamide-imide enamel, as sold by Amoco Chemicals Company) are comparable.

Examples LXVI through CIV

Examples XXVII through LXV were repeated in the same manner as above described except that the reaction solutions subsequent to the completion of the first reaction step at the less severe conditions are once again agitated and heated to a temperature of about 150° C. and maintained at this temperature and atmospheric pressure for about eight hours rather than raising the solutions to a temperature of about 190° C. to about 200° C. and maintaining the solutions at that temperature for about two hours as above described. The resultant soltuions are cooled to room temperature and filtered, if necessary. The resultant solutions are adjusted by dilution to a resin solution of approximately 25% weight resin and 75% solvent.

The resultant solutions were then applied in six consecutive coats to a bare copper conductor having no insulation thereon and in two consecutive coats to an insulated conductor having a base coat consisting of four coats of imidized modification of a polyester resin employing dies in a conventional wire coating tower at 33 feet per minute, having bank temperatures of 850° F., 800° F., and 600° F. The properties of the resultant magnet wire and the properties of a similar bare conductor and an insulated conductor having two coats of a commercially available polyamide-imide resin (AI–537 polyamide-imide enamel, as sold by Amoco Chemicals Company) are comparable.

Examples CV through DXX

Each of the aforedescribed examples were repeated substituting for one-half of the molar amount of trimellitic acid anhydride reacted in each of the examples an equivalent molar amount of 1,2,4-benzene tricarboxylic anhydride 3,4,6-naphthalene tricarboxylic anhydride
1,2,7-anthracene tricarboxylic anhydride, and
1,3,8-naphthalene tricarboxylic anhydride.

The resultant resin solutions are cooled to room temperature and filtered, if necessary. The resultant solutions are adjusted by dilution to a resin solution of approximately 25% weight resin and 75% solvent.

The resultant solutions were then applied in six consecutive coats to a bare copper conductor having no insulation thereon and in two consecutive coats to an insulated conductor having a base coat consisting of four coats of imidized modification of a polyester resin employing dies in a conventional wire coating tower at 33 feet per minute, having bank temperatures of 850° F., 800° F., and 600° F. The properties of the resultant magnet wire and the properties of a similar bare conductor and an insulated conductor having two coats of a commerically available polyamide-imide resin (AI–537 polyamide-imide enamel, as sold by Amoco Chemicals Company) are comparable.

Examples DXXI through CMXXXVI

Substituting for the trimellitic aicd anhydride the same molar amount of 1,2,4-benzene tricarboxylic anhydride, 3,4,6-naphthalene tricarboxylic anhydride, 1,2,7-anthracene tricarboxylic anhydride and 1,3,8-naphthalene tricarboxylic anhydride, Examples I to CIV are repeated. The resultant solutions are cooled to room temperature and filtered, if necessary. The resultant solutions are adjusted by dilution to a resin solution of approximately 25% weight resin and 75% solvent.

The resultant solutions were then applied in six consecutive coats to a bare copper conductor having no insulation thereon and in two consecutive coats to an insulated conductor having a base coat consisting of four coats of imidized modification of a polyester resin employing dies in a conventional wire coating tower at 33 feet per minute, having bank temperatures of 850° F., 800° F., and 600° F. The properties of the resultant magnet wire and the properties of a similar bare conductor and an insulated conductor having two coats of a commercially available polyamide-imide resin (AI–537 polyamide-imide enamel, as sold by Amoco Chemicals Company) are comparable.

Examples CMXXXVII through MX

Each of the above-described examples, Examples I through CMXXXVI, were repeated substituting the isocyanates listed hereinbelow in the same molar amount and in the order that they are listed, for all of the p,p'-diphenyl methane diisocyanate used therein, for example 0.31 mole of 1,4-phenylene diisocyanate was used in Example I, 0.31 mole of 2,5-tolylene diisocyanate was used in Example II, etc., and each of the Examples I through CMXXXVI were again repeated substituting for ½ of the molar amount of the p,p'-diphenyl methane diisocyanate the same molar amount of the isocyanates listed below in in the order that they are listed, for example, 0.155 mole of 1,4-phenylene diisocyanate was substituted for 0.1555 mole of p,p'-diphenyl methane diisocyanate in Example I, etc.

1,4-phenylenediisocyanate
2,5-tolylenediisocyanate
3,5-tolyenediisocyanate
1-methoxy-2,4-phenylenediisocyanate
1,3,5-triethyl-2,4-phenylenediisocyanate
1-methyl-3,5-diethyl-6-chloro-2,4-phenylenediisocyanate
p-xylylenediisocyanate
benzophenone-4,4'-diisocyanate
1,4-naphthylenediisocyanate
4,4'-diisocyanate-diphenyldimethylmethane
4,4'-diisocyanate-3,3'-dimethyldiphenylmethane
1,5-naphthylenediisocyanate
4,4'-diisocyanate-3,3'-dichlorodiphenylmethane
4,4'-diisocyanate-diphenylether and 2,4-diisocyanate-diphenylether
1,3-phenylenediisocyanate
3,3'-dimethoxy-4,4'-biphenylenediisocyanate
3,3'-diethoxy-4,4'-biphenylenediisocyanate
2,4-tolylenediisocyanate
2,6-tolylenediisocyanate
4-chloro-1,3-phenylenediisocyanate
4,4'-biphenylenediisocyanate
3,3'-dimethyl-4,4'-biphenylenediisocyanate
m-xylylenediisocyanate
1-methyl-3,5-diethyl-2,4-phenylenediisocyanate
diphenyl-4,4-diisocyanate
diphenyl methane-4,4-diisocyanate
4,4-dimethyldiphenyl methane-2,2-diisocyanate
4 methoxy-1,3-phenylene diisocyanate
4-isopropyl-1,3, phenylene diisocyanate
durylene diisocyanate
3,3'-bitolylene-4,4 diisocyanate
1-methyl-3,5-diethyl-2,6-phenylenediisocyanate
4,4'-diisocyanate-2,2-diphenylpropane
4,4'-diisocyanate-diphenylmethane
4,6-dimethyl-1,3-xylylene diisocyanate
4,4'-diisocyanate-diphenyl
meta-phenylenediisocyanate The resultant resin solutions were cooled to room temperature and filtered if necessary. The resultant solutions were adjusted by dilution to a resin solution of approximately 25% eight resin and 75% solvent.

The resultant solutions were then applied in six consecutive coats to a bare copper conductor having no insulation thereon and in two consecutive coats to an insulated conductor having a base coat consisting of four coats of imidized modification of a polyester resin employing dies in a conventional wire coating tower at 33 feet per minute, having bank temperatures of 850° F., 800° F., and 600° F. The properties of the resultant magnet wire and the properties of a similar bare conductor and an insulated conductor having two coats of a commercially available polyamide-imide resin AI–537 polyamide-imide enamel, as sold by Amoco Chemicals Company) are comparable.

Examples MXI through MMXX

Each of the above-described examples, Examples I through MX were repeated substituting for the tricarboxylic acid anhydrides used therein the same molar amount of a combination of the same tricarboxylic acid anhydride and the corresponding tricarboxylic acid having 95% weight tricarboxylic acid anhydride and 5% weight tricarboxylic acid. The resultant solutions are cooled to room temperature and filtered, if necessary. The resultant solutions are adjusted by dilution to a resin solution of approximately 25% weight resin and 75% weight solvent.

The resultant solutions were then applied in six consecutive coats to a bare copper conductor having no insulation thereon and in two consecutive coats to an insulated conductor having a base coat consisting of four coats of imidized modifications of a polyester resin employing dies in a conventional wire coating tower at 33 feet per minute, having bank temperatures of 850° F., 800° F. and 600° F. The properties of the resultant magnet wire and the properties of a similar bare conductor and an insulated conductor having two coats of a commercially available polyamide-imide resin (AL-537 polyamide-imide enamel, as sold by Amoco Chemical Company) are comparable.

The invention provides not only an improved method of making polyamide-imide resins, aromatic amides and aromatic polyamide resins which is preferred over the conventional method but also an improved magnet wire enamel. This is due to the high molecular weight and relatively narrow molecular weight distribution and the linearity of the resins produced by the method of the invention. The invention also provides an improved method of making polyamide-imide resins which eliminates the formation of an amide-acid intermediate, does not require solid state polymerization, and does not result in the formation of a partly polymerized resin product. In contrast, the method of the invention results in a completely imidized polyamide-imide resin which is essentially linear, of high molecular weight and a narrow molecular weight distribution.

The elimination of the formation of the amide-acid intermediate and partially polymerized resin products for the most part eliminates the prior problems associated with the application of polyamide-imide resins from solution, including the tendency of such resins to blister. The elimination of the formation of the amide-acid intermediate eliminates the requirement of use of stainless steel equipment in contact with the resin solution and the elimination of solid state polymerization eliminates the requirement of specialized equipment. These resin products are stable and can be stored for many months prior to use.

The method of the invention improves the compatibility and usefulness of the resin products both alone and with the other resins such that the resin may better be used as a coating and as an overcoat superposed upon base coats of other resin materials.

While there have been described above the principles of this invention in connection with specific chemistry, it is to be clearly understood that this description is made only by way of example and not as a limitation to the scope of the invention.

TABLE I
Properties of AW6 #18 wire coated with examples of resin solutions of the invention

| Enamel, base | None | None | None | None | Isonel 200E | Isonel 200E | Isonel 200E | Isonel 200E | Isomid |
|---|---|---|---|---|---|---|---|---|---|
| Enamel, topcoat | AI-537 | Example I | Example II | Example V | AI-537 | Example II | Example III | Example IV | Example V |
| Viscosity, cps. at 30° C | 1,800 | 880 | 1,821 | 4,000 | 1,800 | 1,821 | 1,000 | 1,300 | 4,000 |
| Percent solids | 25 | 20 | 25 | 25 | 25 | 25 | 25 | 20 | 25 |
| Surface rating | 1.1 | 1.1 | 1.1 | 1.1 | 1.3 | 1.1 | 1.2 | 1.1 | 1.1 |
| Build, mils | 2.5–2.7 | 2.7–2.9 | 2.9–3.1 | 2.9–3.1 | 2.8–3.0 | 3.0–3.1 | 2.8–2.9 | 2.7–2.9 | 2.8–2.9 |
| Flexibility: | | | | | | | | | |
| Elongation | 37 | 38 | 36 | 36 | 35 | 34 | 34 | 34 | 38 |
| Mandrel flex., 20%-IX | O.K. | O.K. | O.K. | O.K. | O.K. | O.K. | O.K. | O.K. | O.K. |
| Snap | O.K. | O.K. | O.K. | O.K. | O.K. | O.K. | O.K. | O.K. | O.K. |
| Snap-IX | (¹) | (¹) | (¹) | (¹) | (¹) | (¹) | (¹) | (¹) | (¹) |
| Heat shock: | | | | | | | | | |
| 20%-3X 240° C | 0/20 | 0/20 | 0/20 | 0/20 | 0/20 | 0/20 | 0/20 | 0/20 | 0/20 |
| 20%-3X 260° C | 0/20 | 0/20 | 0/20 | 0/20 | 0/20 | 0/20 | 0/20 | 0/20 | 0/20 |
| Reliance 40A burnout, min | 1.1 | 29.3 | 8.9 | 3.6 | 1.8 | 2.4 | 2.3 | 2.1 | 2.5 |
| NEMA cut-thru, ° C | 327 | 372 | 345 | 352 | 376 | 386 | 383 | 384 | 373 |
| Scrape tests: | | | | | | | | | |
| Abrasion | | | | | 140 | 147 | 103 | 95 | 168 |
| Unilateral | | | | | 1,460 | 1,480 | 1,470 | 1,450 | 1,380 |
| Slit twist | 39 | 40 | 37 | 38 | 42 | 39 | 43 | 40 | 39 |

¹ Fail.

Note.—All runs—6 coats on 18 AWG wire. All runs without topcoat—6 coats of the resin of the invention. All runs having topcoat—4 coats of conventional resin and 2 coats of a resin of the invention.

What is claimed is:

1. A solution of an essentially linear reaction product resulting from reacting essentially equal molar amounts of aromatic diisocyanate and aromatic tricarboxylic acid anhydride reactant of the group consisting of aromatic tricarboxylic acid anhydrides and combinations of aromatic tricarboxylic acid anhydrides and aromatic tricarboxylic acids containing no more than about 5% acid on a weight basis being reacted in a solution comprising said diisocyanate, said tricarboxylic acid anhydride reactant and an inert polar solvent containing a major portion of inert solvent and less than 50% weight of said diisocyanate and tricarboxylic acid anhydride reactant initially at reaction conditions ranging from about room temperature for from about sixteen hours to about seventy-two hours to about 80° C. for about five hours at atmospheric pressure and subsequently at an elevated temperature from about 150° C. to about 200° C. at atmospheric pressure.

2. The method comprising the step of dissolving essentially equal molar amounts of (1) aromatic tricarboxylic acid anhydride reactant of the group consisting of aromatic tricarboxylic acid anhydrides and combinations of aromatic tricarboxylic acid anhydrides and aromatic tricarboxylic acids containing no more than about 5% weight acid and (2) aromatic diisocyanate in an amount of inert polar solvent of said tricarboxylic acid anhydride reactant and diisocyanate thereby to form a solution thereof, said solution containing less than 50% weight of said diisocyanate and tricarboxylic acid reactant, allowing said solution to stand at reaction conditions ranging from about room temperature for about sixteen hours to about seventy-two hours to about 80° C. for about five hours at atmospheric pressure, and expelling carbon dioxide from said solution.

3. The method of claim 2 wherein said allowing step is performed from about 60° C. to about 70° C. at atmospheric pressure.

4. The method of claim 2 wherein said expelling step comprises heating said solution to an elevated temperature from about 150° C. to about 200° C. at atmospheric pressure.

5. The method of claim 2 wherein said allowing and expelling steps include the steps of reacting said acid anhydride reactant and aromatic diisocyanate thereby forming an imide group from an anhyride group or a pair of orthocarboxyl groups of said acid anhydride reactant, and reacting said acid anhydride reactant and aromatic diisocyanate thereby forming an amide group from the remaining carboxyl group of said acid anhydride reactant, both said first-mentioned reacting and said last-mentioned reacting steps including the step of producing carbon dioxide.

6. The method of claim 2 wherein said allowing and expelling steps include the step of reacting said acid anhydride reactant and diisocyanate thereby to form amide and imide groups.

7. The method of claim 2 wherein said expelling step is carried to completion thereby resulting in a solution of an essentially completely imidized and amidized polyamide-imide resin in said inert solvent.

8. The method of claim 2 wherein said triacarboxylic acid anhydride reactant is of the group consisting of trimellitic anhydride, 1,2,4-benzene tricarboxylic acid anhydride, 3,4,6-naphthalene tricarboxylic acid anhydride, 1,2,7-anthracine tricarboxylic anhydride, 1,3,8-naphthalene tricarboxylic acid anhydride, and combinations of said anhydrides and trimellitic acid, 1,2,4-benzene tricarboxylic acid, 1,3,4,6-naphthalene tricarboxylic acid, 1,2,7-anthracine tricarboxylic acid and 1,3,8-naphthalene tricarboxylic acid having no more than 5% total acid on a weight basis and combinations of said anhydrides.

9. The method of claim 2 wherein said diisocyanate is of the group consisting of:

1,4-phenylenediisocyanate
2,5-tolylenediisocyanate
3,5-tolylenediisocyanate
1-methoxy-2,4-phenylenediisocyanate
1,3,5-triethyl-2,4-phenylenediisocyanate
1-methyl-3,5-diethyl-6-chloro-2,4-phenylenediisocyanate
p-xylylenediisocyanate
benzophenone-4,4′-diisocyanate
1,4-naphthylenediisocyanate
4,4′-diisocyanate-diphenyldimethylmethane
4,4′-diisocyanate-3,3′-dimethyldiphenylmethane
1,5-naphthylenediisocyanate
4,4′-diisocyanate-3,3′-dichlorodiphenylmethane
4,4′-diisocyanate-diphenylether and 2,4-diisocyanate-diphenylether
1,3-phenylenediisocyanate
33′-dimethoxy-4,4′-biphenylenediisocyanate
3,3′-diethoxy-4,4′-biphenylenediisocyanate
2,4-tolylenediisocyanate
2,6-tolylenediisocyanate
4-chloro-1,3-phenylenediisocyanate
4,4′-biphenylenediisocyanate
3,3′-dimethyl-4,4′-biphenylenediisocyanate
m-xylylenediisocyanate
1-methyl-3,5-diethyl-2,4-phenylenediisocyanate
diphenyl-4,4-diisocyanate
diphenyl methane-4,4-diisocyanate
4,4-dimethyldiphenyl methane-2,2-diisocyanate
4-methoxy-1,3-phenylene diisocyanate
4-isopropyl-1,3-phenylene diisocyanate
durylene diisocyanate
3,3′-bitolylene-4,4-diisocyanate
1-methyl-3,5-diethyl-2,6-phenylenediisocyanate
4,4′-diisocyanate-2,2-diphenylpropane
4,4′-diisocyanate-diphenylmethane
4,6-dimethyl-1,3-xylylene diisocyanate
4,4′-diisocyanate-diphenyl meta-phenylenediisocyanate
and combinations thereof.

10. The method of claim 2 wherein said diisocyanate is of the group consisting of:

1,4-phenylenediisocyanate
2,5-tolylenediisocyanate
3,5-tolylenediisocyanate
1-methoxy-2,4-phenylenediisocyanate
1,3,5-triethyl-2,4-phenylenediisocyanate
1-methyl-3,5-diethyl-6-chloro-2,4-phenylenediisocyanate
p-xylylenediisocyanate
benzophenone-4,4′-diisocyanate
1,4-naphthylenediisocyanate
4,4′-diisocyanate-diphenyldimethylmethane
4,4′-diisocyanate-3,3′-dimethyldiphenylmethane
1,5-naphthylenediisocyanate
4,4′-diisocyanate-3,3′-dichlorodiphenylmethane
4,4′-diisocyanate-diphenylether and 2,4-diisocyanate-diphenylether
1,3-phenylenediisocyanate
3,3′-dimethoxy-4,4′-biphenylenediisocyanate
3,3′-diethoxy-4,4′-biphenylenediisocyanate
2,4-tolylenediisocyanate
2,6-tolylenediisocyanate
4-chloro-1,3-phenylenediisocyanate
4,4′-biphenylenediisocyanate
3,3′-dimethyl-4,4′-biphenylenediisocyanate
m-xylylenediisocyanate
1-methyl-3,5-diethyl-2,4-phenylenediisocyanate
diphenyl-4,4-diisocyanate
diphenyl methane-4,4-diisocyanate
4,4-dimethyldiphenyl methane-2,2-diisocyanate
4-methoxy-1,3-phenylene diisocyanate
4-isopropyl-1,3-phenylene diisocyanate
durylene diisocyanate
3,3′-bitolylene-4,4-diisocyanate
1-methyl-3,5-diethyl-2,6-phenylenediisocyanate
4,4′-diisocyanate-2,2-diphenylpropane
4,4′-diisocyanate-diphenylmethane
4,6-dimethyl-1,3-xylylene diisocyanate
4,4′-diisocyanate-diphenyl meta-phenylenediisocyanate
and combinations of p,p′-diphenylmethane diisocyanate and any of the above.

References Cited
UNITED STATES PATENTS

| | | | |
|---|---|---|---|
| 3,314,923 | 4/1967 | Muller et al. | 260—78 |
| 3,300,420 | 1/1967 | Frey | 260—77.5 |
| 3,541,038 | 11/1970 | Nakano et al. | 260—77.5 |
| 3,578,638 | 5/1971 | Fang | 260—77.5 |
| 3,317,480 | 5/1967 | Fetscher et al. | 260—77.5 |
| 3,551,383 | 12/1970 | Fang | 260—77.5 |

DONALD E. CZAJA, Primary Examiner

MELVYN I. MARQUIS, Assistant Examiner

U.S. Cl. X.R.

117—218; 260—2.5 AM, 30.2, 32.6 R, 78 TF

UNITED STATES PATENT OFFICE
CERTIFICATE OF CORRECTION

Patent No. 3,790,530            Dated February 5, 1974

Inventor(s) Ernest C. Koerner et al.

It is certified that error appears in the above-identified patent and that said Letters Patent are hereby corrected as shown below:

IN THE SPECIFICATION

In column 2, line 70, change "amomatic" to --aromatic--.
In column 3, line 27, change "narow" to --narrow--.
In column 3, line 45, change "involves" to --involve--.
In column 3, line 72, change "polyamine-" to --polyamide- --.
In column 7, lines 14-19, delete the sentence beginning "Examples 1011 through 2020".
In column 7, line 66, change "Amoco Chemical Company" to --Amoco Chemicals Company--.
In column 9, line 49, delete the "a" after "and".
In column 10, lines 16-17, delete the sentence beginning "The resultant solution".
In column 11, line 39, change "disphenyl" to --diphenyl--.
In column 12, line 2, change "company" to --Company--.
In column 12, line 20, change "minutes" to --minute--.
In column 13, line 58, change "throngh" to --through--.
In column 14, line 8, change "Al-537" to --AI-537--.
In column 14, line 53, after "pany" insert --)--.
In column 15, line 11, change "soltuions" to --solutions--.

In column 15, lines 52-53, change "commerically" to --commercially--.
In column 15, line 75, after "and" insert --an--.
In column 16, line 17, delete the second occurance of "in".
In column 16, line 19, change "0.1555" to --0.155--.
In column 16, line 62, change "eight" to --weight--.

In column 17, line 38, change "modifications" to --modification--.
In column 17, line 44, change "(AL-537)" to --(AI-537)--.

IN THE CLAIMS

In claim 9, column 19, line 49, change "33' " to --3.3'--.

Signed and sealed this 29th day of October 1974.

(SEAL)
Attest:

McCOY M. GIBSON JR.          C. MARSHALL DANN
Attesting Officer          Commissioner of Patents